(12) United States Patent
Cheng et al.

(10) Patent No.: US 7,903,605 B2
(45) Date of Patent: Mar. 8, 2011

(54) COORDINATING TRANSMISSION SCHEDULING AMONG MULTIPLE BASE STATIONS

(75) Inventors: Fang-Chen Cheng, Randolph, NJ (US); Shupeng-Li, Edison, NJ (US); Lei Song, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/684,250

(22) Filed: Jan. 8, 2010

(65) Prior Publication Data

US 2010/0142471 A1 Jun. 10, 2010

Related U.S. Application Data

(62) Division of application No. 11/421,632, filed on Jun. 1, 2006, now abandoned.

(51) Int. Cl.
*H04W 4/00* (2009.01)
(52) U.S. Cl. .......................................... 370/328
(58) Field of Classification Search .................. 370/328, 370/329
See application file for complete search history.

(56) References Cited

U.S. PATENT DOCUMENTS

2006/0094372 A1* 5/2006 Ahn et al. .................. 455/67.13

FOREIGN PATENT DOCUMENTS

| AU | GB 2360909 A | 10/2001 |
|---|---|---|
| EP | 1 209 930 A | 5/2002 |
| EP | 1209940 A | 5/2002 |

OTHER PUBLICATIONS

International Search Report and Written Opinion mailed Dec. 4, 2007.

Alcatel: "Interference coordination for evolved UTRA uplink access; 4.1, Technical Solutions; R1-05-0593; 3GPP TSG RAN WG1 AdHoc on LTE", Jun. 20, 2005.

Lucent Technologies: Uplink Scheduling with Inter-cell Interference Control; R2-062228; 3GPP TSG-RAN2 #54, Aug. 28, 2006-Sep. 1, 2006; XP002459691—the whole document.

Mihailescu C et al., "Dynamic resource allocation for packet transmission in UMTS TDD-CDMA systems"; Vehicular Technology Conference, 1999 IEEE 49th Houston, TX, USA May 16-20, 1999; Piscataway, NJ, USA, pp. 1737-1741; XP010342115.

* cited by examiner

*Primary Examiner* — Derrick W Ferris
*Assistant Examiner* — Mang Yeung
(74) *Attorney, Agent, or Firm* — Williams, Morgan & Amerson, PC

(57) ABSTRACT

A method and an apparatus for scheduling transmissions of a plurality of cells in a wireless communications system including one or more base stations is provided. The method comprises providing a set of virtual channels to enable an intra-cell transmission orthogonal to another transmission within each cell of the plurality of cells and inter-cell transmissions orthogonal to other transmissions across a cluster of cells associated with the one or more base stations. The method further comprises exchanging signaling messages between two or more base stations to coordinate scheduling of the intra-cell transmission with the inter-cell transmissions for the cluster of cells. For optimizing a parameter associated with scheduling of a plurality of users from a cluster of cells in a wireless communication system, an optimal power level for the parameter of each active user may be searched to maximize an indication of system capacity of the wireless communication system. This enables a coordinated jointly scheduling of the users active in the cluster of cells based on the optimal power levels such that the total interference within the cluster may be minimized to maximize the system throughput/capacity.

7 Claims, 5 Drawing Sheets

High Layer Algorithm

Initialize $\{P_{i,j,k}\}$ for all $i,j,k$

↓

Calculate for all $i,j,k$
Throughput gain $\{A_{i,j,k}\}$
CCI&ICI loss $\{B_{i,j,k}\}$

↓

Calculate for all $i,j,k$
Tx Credit:
$L_{i,j,k} = A_{i,j,k} - B_{i,j,k} - \lambda_i$

↓

If max $L_{i,j,k} > 0$? → $P_{i,j,k} = P_{i,j,k} + \Delta P$ $\lambda$ | $P$

---

Low Layer Algorithm

Update $\lambda_i$, for $i = 1,...,I$:
$\lambda_i$ new $= \lambda_i$ old $+ (P0 - \Sigma_j \Sigma_k P_{i,j,k})$

↓

Converge?
($|\lambda_i$ new $= \lambda_i$ old$| < \delta$ for all $j$?)

↓

$\{P_{i,j,k}\}$ is the power assignments

FIG. 4

COORDINATING TRANSMISSION SCHEDULING AMONG MULTIPLE BASE STATIONS

This application is a divisional of Ser. No. 11/421,632, filed Jun. 1, 2006 now abandoned.

FIELD OF THE INVENTION

This invention relates generally to telecommunications, and more particularly, to wireless communications.

DESCRIPTION OF THE RELATED ART

In multi-user network environments, since many users desire access to network resources, scheduling is a useful technique to determine a way in which users may access the network resources. In many wireless communication systems, for instance, multiple users access a common access medium. A scheduling algorithm typically determines allocation of a channel to provide each user access to the common access medium with minimal interference to other users. The scheduling algorithm in a communication network may determine an efficient use of network resources, for example, to maximize network throughput.

As multiple users seek access to a network, a scheduler may provide access that maximizes network throughput with a desired Quality of Service (QoS) for communications. For example, in a wireless communications network, a base station controller (BSC) or a radio network controller (RNC) may schedule reverse link (RL) or uplink (UL) communications from the mobile stations to the base stations. Alternatively, a base station may schedule forward link (FL) or downlink (DL) communications in adjacent cells serviced by other base stations. A mobile station in a handoff communicates with two or more base stations as it transitions from one base station to another, affecting the scheduling of the communications therebetween. For scheduling a data packet transmission on a reverse link from a mobile station, a base station indicates a data rate, a radio resource and a corresponding power level that may reduce interference from such communications.

Wireless communication systems have been evolving from the $1^{st}$ generation analog cellular systems (Advanced Mobile Phone System (AMPS) system) to the $2^{nd}$ generation digital cellular systems (CDMA One, TDMA and Global System for Mobile communications (GSM)) to the $3^{rd}$ generation digital multimedia systems (CDMA2000 1x and Universal Mobile Telecommunications System (UMTS)) to the high-speed data system (CDMA2000 Evolution-Data Optimized (EV-DO) and UMTS High-Speed Downlink Packet Access (HSDPA)/Enhanced Dedicated Channel (E-DCH)).

While the $3^{rd}$ generation wireless system can support multimedia service with a desired Quality of Service (QoS), the efficiency of the $3^{rd}$ generation wireless system for robust data transmission is not that high since the system is a circuit-switching type system. On the other hand, a packet switching type high-speed data system uses efficient radio resource sharing and scheduling with radio channel awareness in the transmission. Such scheduling coordinates the shared access based on the feedback of individual radio channel conditions. By scheduling the transmission in favor of the good channel users at any short time interval, the fast scheduling approach improves the system data throughput. In order to respond to varying radio channel conditions for providing relatively high efficient data transmission, scheduling and resource management functions have been relocated to the base stations. For example, downlink radio resources in both the temporal domain and the frequency domain may be controlled by a scheduler in the base station. A scheduling algorithm may assign one or more channels or sub-channels to the mobile station. Resource allocation typically includes determining powers and/or bandwidth to optimize performance within the cell served by the base station.

Many high-speed packet switching systems, including HSDPA and E-DCH, focus on the optimization of the shared access control of the transmitted time, power, data rate, overall system rise over thermal (RoT) and physical layer forms of users in the same cell. The optimization of the shared access control relates to control of an interference source. When a shared access control is applied within a cell only, the cross interference (inter-cell interference) to the other cell is generated proportionally to the signal strength for the intra-cell. This interference limits the ability to improve overall system signal-to-noise ratio (SNR) and spectral efficiency. Spectral efficiency is a measure of the performance of encoding to transmit bits at a given data rate using bandwidth based on an encoding method that codes information.

Generally, interference management may be categorized into three classes, namely interference avoidance, interference coordination, and interference mitigation. Interference avoidance involves creating a strategy and executing it independently at each cell for shared access control to reduce the interference with each other. Interference coordination coordinates the strategy between cells for further suppressing the potential interference. By jointly transmitting between cells, interference mitigation reduces the potential interference between the cell served by the base station and adjacent cells.

More specifically, the interference avoidance or coordination schemes suppress the cross interference by creating an orthogonal set in time (time sharing) or frequency (frequency reuse). Management of the transmitted power and synchronization between the nodes, such as the base stations may reduce the cross interference. The interference avoidance or coordination schemes control the interference level to meet the desired QoS levels of each service. However, the time/frequency sharing or transmitted power management strategy does not improve the spectral efficiency.

Interference mitigation schemes may also be implemented to reduce interference between the cell served by the base station and adjacent cells. For example, base stations in adjacent cells may transmit using the same set of frequency channels. If both base stations allocate the same frequency channel to different mobile units, then the mobile units may receive a composite signal including signals from both base stations on the assigned frequency channel. One portion of the composite signal is the desired signal and another portion of the composite signal will be seen as interference, which is conventionally referred to as "inter-cell interference." Inter-cell interference may interfere with, and potentially disrupt, communication with the mobile units. Thus, interference mitigation schemes typically minimize inter-cell interference by coordinating assignment of the radio channels, and the power assigned to each channel, among base stations that serve adjacent cells.

In wireless communications, some interference is also caused by lack of the coordination between the transmissions and resource management. Many cellular communication systems manage the interferences and noise through cell planning, interference coordination, interference avoidance, transmitted power control, transmitted rate adaptation or radio resource management schemes. Some interference management schemes adapt radio resources based on the level of the interference received and the tolerable interference to meet its QoS requirement. Fast communication links between the nodes and a large-scale radio resource management in real time enables control of the transmission based on a relatively fast radio channel feedback through an air interface and coordinates the transmission between cells for the interference management. To improve system performance, a high-speed wireless access system adapts communication links between the nodes or base stations. However, signal-to-interference ratio (SIR) limits the link adaptation because interference limits the SIR caused by a neighboring system. For providing interference management, a high-speed data system, such as a UMTS HSDPA/E-DCH system, incorporates a relatively fast feedback of the radio channel condition and transmission rate adaptation. However, such a passive interference management provides a limited gain on system performance and the spectral efficiency. Moreover, both the wideband CDMA (W-CDMA) and HSDPA systems being passive in interference management may not provide a desired system performance and the spectral efficiency.

Several access technologies use aggressive interference management schemes. Two examples of the aggressive interference management schemes include CDMA interference cancellation (or UL multi-user detection) and the pre-coding techniques. The interference cancellation scheme estimates the interference at the receivers and subtracts the re-encode interference into the received signals for further demodulation. However, the interference cancellation technique is limited by the estimated accuracy of the interference at a receiver, which is determined by the received signal to noise ratio. The pre-coding technique integrates the estimated interference into the channel coding of a transmitted signal to minimize the interference at the receiver side. However, the required knowledge of the channel response in real time for the channel coding limits the pre-coding technique. Accordingly, both the interference cancellation and pre-coding techniques have severe consequences of performance degradation if the estimated interference is inaccurate because the estimated errors in the planned removal of the interference introduce other sources of interference.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for scheduling transmissions of a plurality of cells in a wireless communications system including one or more base stations. The method comprises providing a set of channels to enable an intra-cell transmission orthogonal within each cell of the plurality of cells and inter-cell transmissions orthogonal across a cluster of cells associated with the one or more base stations. The method further comprises coordinating scheduling of the intra-cell transmission with the inter-cell transmissions for the cluster of cells between at least two base stations of the one or more base stations.

In yet another embodiment, a method is provided for optimizing a parameter associated with scheduling of a plurality of users from a cluster of cells in a wireless communication system. The method comprises searching an optimal power level for the parameter of each user of the plurality of users to maximize an indication of system capacity of the wireless communication system. The method further comprises jointly scheduling the plurality of users active in the cluster of cells based on the optimal power levels.

BRIEF DESCRIPTION OF THE DRAWINGS

The invention may be understood by reference to the following description taken in conjunction with the accompanying drawings, in which like reference numerals identify like elements, and in which:

FIG. 4 illustrates a stylized representation for implementing a method of scheduling power in frequency domain for the transmissions from the base stations to the active Access Terminals in the cluster of cells to maximize the total throughput or capacity for each base station shown in FIG. 1, according to one embodiment of the present invention.

Figure 1:
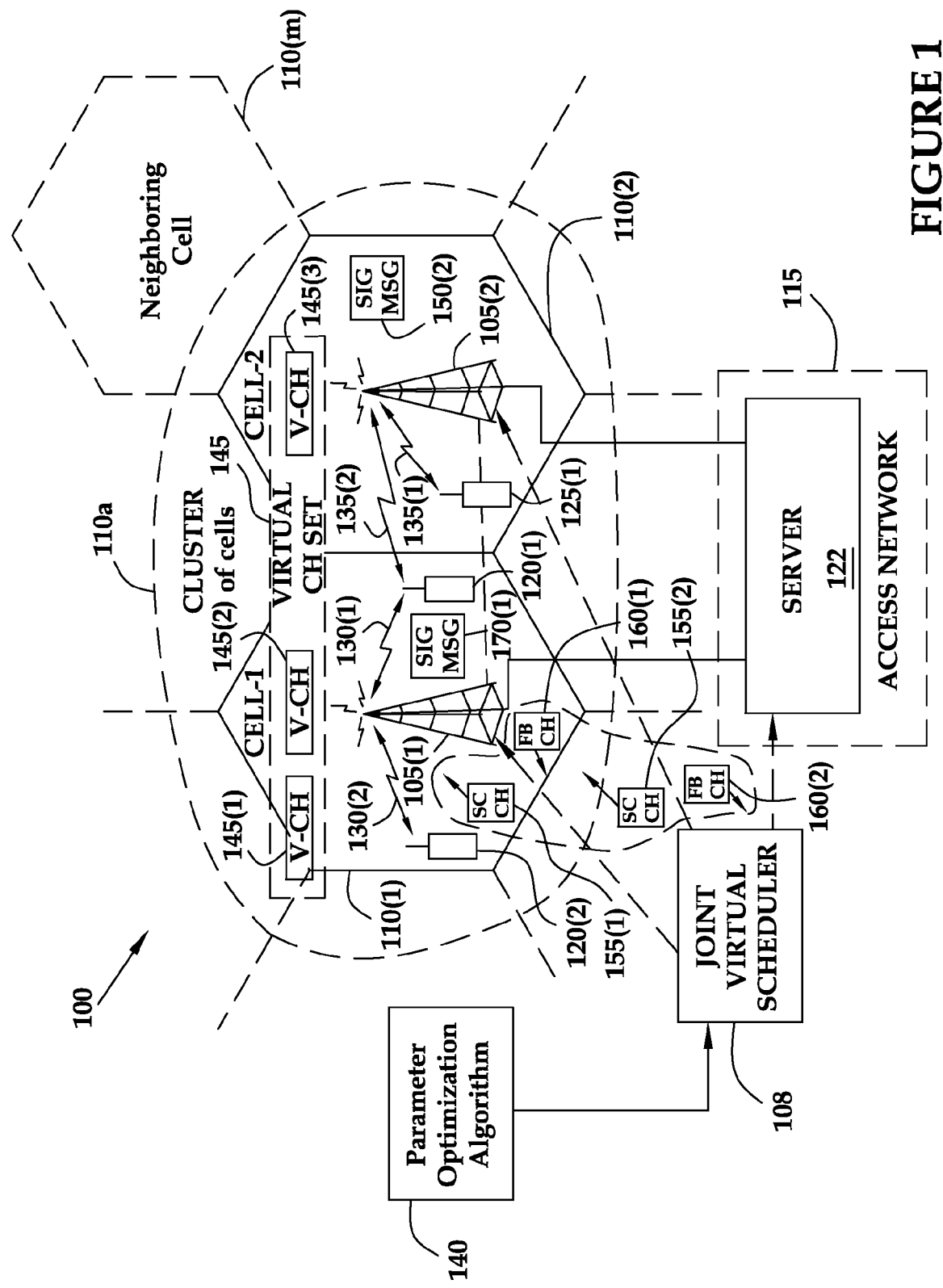
FIG. 1 schematically depicts a wireless communications system, such as a Long Term Evolution (LTE) UMTS system which includes first and second base stations and a joint virtual scheduler for scheduling transmissions of a plurality of cells in a relatively high-speed wireless access network according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for coordinating transmission scheduling among multiple access nodes or base stations. By using relatively fast communication between the access nodes or base stations and resource management in real time, a Universal Mobile Telephone System (UMTS) Long Term Evolution (LTE) may control the transmission based on fast radio channel feedback through an air interface and coordinate the transmission between cells for managing interference. In particular, a joint scheduler may manage one or more radio resource of all base stations in a cluster in real time and jointly control the interference to optimize the overall system performance. By using radio resource management and interference mitigation, the joint scheduler may maximize the signal-to-noise ratio of a received signal and thus improve the system spectral efficiency. The joint scheduler may jointly coordinate the transmissions of cells in a cluster to minimize the overall interference. By jointly coordinating communications of the cells in the cluster together, the joint scheduler may mitigate interference from the other neighboring cells and provide a signal strength enhancement instead. The interference management may minimize the generation of the interference and the transmitted power may be transformed into a gain, which increases the spectral efficiency and may enhance system capacity for each cell with universal reuse. To this end, the joint scheduler may create a super set of orthogonal virtual channels across all the cells in the cluster. The interference mitigation may enhance the signal-to-noise ratio of the received signal. The super virtual channel set comprises a set of virtual channels that may be used in each cell with universal reuse. Since the virtual channels in the super virtual channel set are orthogonal to each other within the same cell and across the cells, the super virtual channel set for all cells in the cluster enable the transmission to be orthogonal to each other (intra and inter) cells. This orthogonal inter-cell and intra-cell transmission may minimize the total interference within the cluster. The joint scheduler may support multiple access schemes and underlying physical layer forms. The optimization of the system performance for different multiple access schemes and underlying physical layer forms may be based on information available for optimization. The joint scheduler may not rely upon ideal knowledge or feedback of a radio channel condition.

FIG. 1 schematically depicts a wireless communications system, such as a Universal Mobile Telephone System (UMTS) Long Term Evolution (LTE) 100 which includes first and second base stations 105(1, 2) and a joint virtual scheduler 108 for scheduling transmissions of a plurality of geographic areas or cells 110 (1-$m$) in a relatively high-speed wireless access network 115 according to one illustrative embodiment of the present invention. Each base station of the first and second base stations 105(1, 2) may service one or more of the cells 110 (1-$m$). By using one or more of the base stations 105(1, 2), multiple Access Terminals 120(1, 2) and 125(1) (ATs, also known as User Equipment (UE), mobile stations, and the like) active within the cells 110 (1-$m$) may then access the high-speed wireless access network 115 and other interconnected telecommunications systems, such as a publicly switched telephone system (PSTN) and a Data network. To provide wireless connectivity to the Access Terminals 120(1, 2) and 125(1), the base stations 105(1, 2), in turn, may communicate with a Server 122 that connects the cells 110(1-$m$) to the UMTS Long Term Evolution system 100.

For illustrative purposes, the wireless communications system of FIG. 1 is the UMTS Long Term Evolution system 100, although it should be understood that the present invention may be applicable to other systems that support data and/or voice communication. The UMTS Long Term Evolution system 100 has some similarities to a conventional UMTS system, but differs substantially with respect to the operation of the instant invention with regard to the first and second base stations 105(1, 2). That is, in the UMTS Long Term Evolution system 100, the joint virtual scheduler 108 may be either functionally deployed at a server to coordinate scheduling of the transmissions for a cluster 110$a$ of cells in a relatively centralized manner, or alternatively, distributed to the base stations 105(1, 2). However, instead of scheduling transmissions of a single cell or adjacent cells, the joint virtual scheduler 108 may jointly schedule transmissions for the cluster 110$a$ of cells in which multiple active users may be seeking access to a shared resource of the high-speed wireless access network 115.

Thus, it should be appreciated that a coordinated joint virtual scheduling scheme for the UMTS Long Term Evolution system 100 may be useful in at least two instances. First, to reduce the intra-cell interference within a cell 110 of the cluster 110$a$ of cells jointly with the inter-cell interference caused by transmissions of adjacent or nearby cells in the cluster 110$a$ of cells, and second, during hand-offs of the ATs 120 from one base station to another base station of the first and second base stations 105(1, 2). The coordinated joint virtual scheduling scheme may support a diversity combining and/or soft-handover for active users of the cluster 110$a$ of cells in a High-Speed Packet Access interface. The coordinated joint virtual scheduling scheme may cause one or more sources of an inter-cell interference for each user to provide a signal enhancement in a handover region. For example, the coordinated joint virtual scheduling scheme may provide a macro diversity gain in each received signal on a physical channel of the High-Speed Packet Access interface for a set of channels, such as virtual channels 145 from each cell of the cluster 110$a$ of cells that is associated with the diversity combining and/or soft-handover.

The UMTS Long Term Evolution system 100 and the Server 122 may operate according to Universal Mobile Telecommunication Services (UMTS) protocols and may implement Orthogonal Frequency Division Multiple Access (OFDMA). However, persons of ordinary skill in the art having benefit of the present disclosure should appreciate that the present invention is not limited to communication systems that operate according to UMTS and/or OFDMA. In alternative embodiments, the UMTS Long Term Evolution system 100 may operate according to one or more other protocols including, but not limited to, the Global System for Mobile communication (GSM), Code Division Multiple Access (CDMA, CDMA 2000), and the like.

Specifically, each base station of the first and second base stations 105(1, 2) may provide the wireless connectivity to the Access Terminals 120(1, 2) and 125(1) according to any desirable protocol, including a Code Division Multiple Access (CDMA, cdma2000) protocol, an Evolved Data Optimized (EVDO, 1xEVDO) protocol, a Universal Mobile Telecommunication System (UMTS) protocol, a Global System for Mobile communications (GSM) protocol, and like. The cdma2000 1xEV-DO specification uses the term "access network" for a base station, and "access terminal" for a mobile station, however, in the illustrated embodiment, the access network 115 is shown separate from the base stations 105(1, 2).

Examples of the Access Terminals 120(1, 2) and 125(1) may include a host of wireless communication devices including, but not limited to, cellular telephones, personal digital assistants (PDAs), and global positioning systems (GPS) that employ a spread spectrum communications system to operate in the high-speed wireless data network 120, such as a digital cellular CDMA network. Other examples of the Access Terminals 120(1, 2) and 125(1) may include smart phones, text messaging devices, and the like.

In the UMTS Long Term Evolution system 100, the high-speed wireless access network 115 may deploy any desirable protocol to enable wireless communications between the first and second base stations 105(1, 2) and the Access Terminals 120(1, 2) and 125(1) according to any desirable protocol. Examples of such a protocol include a (CDMA, cdma2000) protocol, an Evolved Data Optimized (EVDO, 1xEVDO) protocol, a UMTS protocol, a GSM protocol, and like.

Other examples of such a protocol include a 1xEV-DO protocol, a UMTS protocol, a GSM protocol, and like. The 3G cellular systems based on any one of these protocols, or the like, provide enhanced voice capacity and support high data rate packet based services. As one example, these features are provided in cdma2000 1xEV high rate packet data air interface referred to as IS-856. More specifically, the 3G cellular system cdma2000 1xEV provides high-speed wireless Internet access to users with asymmetric data traffic relative to a cellular network based on IS-95 standard. For example, data rate of an active user at the Access Terminal 120(1) may very from 9.6 kbps to 153.6 kbps.

The base stations 105(1, 2) may be assigned a plurality of channels within a frequency spectrum over which to communicate with the Access Terminals 120(1, 2) and 125(1). The Access Terminal 120(1) within range of both the first and base stations 105(1, 2) may communicate therewith using these channels. In this way, the base stations 105(1, 2) may provide wireless connectivity to corresponding geographical areas or cells **110(1-*m*). As discussed above, the base stations 105(1, 2) may provide wireless connectivity according to UMTS protocols and may implement OFDMA, but the base stations 110 are not limited to these protocols. In the illustrated embodiment, the first base station 105(1) provides wireless connectivity to the Access Terminals 120(1, 2) and the second base station 105(2) provides wireless connectivity to the Access Terminals 125(1). However, persons ordinary skill in the art having benefit of the present disclosure should appreciate that the base stations may provide wireless connectivity to any number of Access Terminals at any location within or proximate to the cells 110(1-*m*)**.

While the first base station 105(1) may provide one or more intra-cell transmissions (TXs) 130(1, 2) with the Access Terminals 120(1, 2), respectively, the second base station 105(2) may provide one or more intra-cell transmissions 135(1) with the Access Terminal 125(1) and one or more inter-cell transmissions (TXs) 135(2) with the Access Terminal 120(1). In the illustrated embodiment, the inter-cell and intra-cell transmissions 130, 135 include one or more channels within a selected frequency band, e.g., the sub-carriers may be defined according to an OFDMA scheme. Persons of ordinary skill in the art should appreciate that sub-carriers may also be referred to using terms such as frequency channels, sub-channels, tones, and the like.

To jointly schedule transmissions for the cluster 110a of cells, the joint virtual scheduler 108 may comprise a parameter optimization algorithm 140 that determines power assignments for active users in the cluster 110a of cells. Based on a given maximum power constraint of each base station 105, the parameter optimization algorithm 140 determines transmit power from the base stations 105 to the Access Terminal 120 or 125 on a particular channel or sub-channel such that the total throughput/capacity of the UMTS Long Term Evolution system 100 is maximized and co-channel interference is minimized.

In the CELL_1 110(1), the base station 105(1) may use different channels for intra-cell transmissions (TXs) 130(1, 2) to transmit information to the Access Terminals 120(1, 2) at a corresponding power assignment indicated by the parameter optimization algorithm 140. However, the intra-cell transmission 135(1) to the Access Terminal 125(1) and the inter-cell transmission 135(2) to the Access Terminal 120(1) from the base station 105(1) in the cell CELL_2 110(2) may be jointly scheduled with the CELL_1 110(1). That is, the base station 105(1) in the cell CELL_2 110(2) of the cluster 110a of cells may utilize the same channel for the inter-cell transmission 135(2) to the Access Terminal 120(1) that the base station 105(1) may be using for one of the intra-cell transmissions 130(1, 2) without increasing inter-cell interference. To optimize an overall performance parameter, e.g., the system throughput/capacity of the UMTS Long Term Evolution system 100, the parameter optimization algorithm 140 may control interference between the cluster 110a of cells jointly by minimizing a source parameter responsible for generating the interference between the cluster 110a of cells.

By managing one or more radio resources, such as transmit power of the base stations 105 (1, 2) in real time, the joint virtual scheduler 108 may jointly schedule the intra-cell transmissions 130(1, 2) and 135(1) along with the inter-cell transmission 135(2) of the cluster 110a of cells. As one example, the parameter optimization algorithm 140 may transform an indication of the transmitted power into a diversity gain. Accordingly, power of the inter-cell and intra-cell transmissions 130, 135 on the channels may be scheduled in a manner that mitigates inter-cell and/or intra-cell interferences.

In cellular communications, besides a radio channel or frequency used for signal transmission, a virtual channel is used to integrate multiple, disparate channels, for example, to collect the feedback for analysis at a single location. The virtual channel in $1^{st}$ generation is a narrow band frequency carrier (FDMA) with frequency reuse pattern between cells. The $2^{nd}$ generation GSM system has a virtual channel in time slot (TDMA) with frequency reuse pattern between cells. The FDMA and TDMA type virtual channels rely on the operation in separation of frequency/time. The frequency reuse pattern controls the co-channel interference from the same frequency at the time during the cell planning. The interference management in the frequency reuse planning considers the static worst-case scenario at the cell edge as the target.

The $3^{rd}$ generation wideband CDMA (W-CDMA) system uses the spreading code (or channelization code) as the virtual channel with the universal frequency reuse by masking with different scrambling code for each cell. While the downlink (DL) W-CDMA channels are orthogonal to each other in code space within a cell 110, the uplink (UL) W-CDMA channels are non-orthogonal to each other since the user mobility prevents synchronous receptions among all users. In the W-CDMA system, control of the transmitted power provides the interference management as a power control function manages both the intra-cell and inter-cell interference. However, such a power control does not affect the interference.

In the DL HSDPA system, the virtual channel is partitioned in both code space and time space. The virtual channel in the HSDPA system is assigned by a scheduler to maximize the data throughput at a Transmission Time Interval (TTI) interval by quickly responding to radio channel measurement feedback. The use of a shorter TTI interval, such as 2 ms, the HSDPA system enables higher speed transmission in a physical layer. Since the virtual channels are orthogonal to each other within the cell 110 in the HSDPA system, the interference management minimizes the inter-cell interference based on the transmitted power assignment.

In operation, the joint virtual scheduler 108 may provide a set of virtual channels 145 to enable the intra-cell transmissions 130(1, 2) and 135(1) orthogonal within each cell 110 of the plurality of cells 110(1-$m$) and the inter-cell transmission 135(2) orthogonal across the cluster 110a of cells associated with the base stations 105(1, 2). The parameter optimization algorithm 140 may partition the set of virtual channels 145 by time, frequency, space, antenna, and/or codes for the cluster 110a of cells. For example, a dynamic partitioning of a resource of the set of virtual channels 145 in real time may adapt a channel variation of each user and an indication of user mobility within the cluster 110a of cells.

To coordinate scheduling of the intra-cell transmissions 130(1, 2) and 135(1) with the inter-cell transmission 135(2) for the cluster 110a of cells, the base stations 105(1, 2) may exchange signaling messages (SIG_MSG) 150(1, 2) therebetween. As described below, the joint virtual scheduler 108 may use the signaling messages 150(1, 2) between the base stations 105(1, 2) to coordinate scheduling of the inter-cell transmission 135(2) with intra-cell transmissions 130(1, 2) and 135(1) for the cluster 110a of cells.

Consistent with one embodiment, the joint virtual scheduler 108 may be distributed in the base stations 105(1, 2) for scheduling a virtual channel of the set of virtual channels 145 for each user and to interconnect the base stations 105(1, 2) with a virtual interconnect. The virtual interconnect may comprise first and second scheduling channels (SC_CH) 155 (1, 2) and first and second feedback channels (FB_CH) 160(1, 2). The joint virtual scheduler 108 may communicate power assignments for active users to the first base station 105(1) over the first scheduling channel (SC_CH) 155(1) and receive feedback over the first feedback channel (FB_CH) 160(1). Likewise, the second base stations 105(2) may receive power assignments for active users over the second scheduling channel (SC_CH) 155(2) and receive feedback over the second feedback channel (FB_CH) 160(2).

By using a high-speed communication link 170(1) between the base stations 105(1, 2), the joint virtual scheduler 108 may collect feedback information and user information from each base station. Based on the feedback information and user information, the joint virtual scheduler 108 may assign a virtual channel of the set of virtual channels 145 to each user in the cluster 110a of cells. In particular, the joint virtual scheduler 108 may fetch the user information of a radio resource characteristic for each user and determine an indication of cross correlation between the cluster 110a of cells to manage overall interference for the cluster 110a of cells.

The joint virtual scheduler 108 may coordinate control and virtual channel assignment between the cluster 110a of cells by delivering control information and an indication of interference to each base station of the base stations 105(1, 2) with a time stamp based on the user information and the indication of cross correlation. The joint virtual scheduler 108 may use a common reference time among the cluster 110a of cells for the reference of the control information and to manage overall interference for the cluster 110a of cells. To use a common reference time among the cluster 110a of cells, the joint virtual scheduler 108 may synchronize the high-speed communication link 170(1) and the virtual interconnect between the base stations 105(1, 2) based on a system and/or a frame counter.

According to an alternate embodiment, a client-server architecture based joint scheduling control may jointly assign a corresponding virtual channel of the set of virtual channels 145 to each user in the cluster 110a of cells. For jointly controlling scheduling of radio resources in the UMTS Long Term Evolution system 100 and managing overall interference thereof for the cluster 110a of cells, in this exemplary embodiment, the joint virtual scheduler 108 may treat each base station 105 as a client for a dedicated scheduling server. The dedicated scheduling server may collect feedback and user information from the cluster 110a of cells as an input to the joint virtual scheduler 108.

In an Orthogonal Frequency Division Multiple Access (OFDMA) interface, however, the coordinated joint virtual scheduling scheme may support macro-diversity coherent combining to mitigate one or more sources of co-channel interference to a diversity transmission from the neighboring cell 110($m$) of the cluster 110a of cells. The coordinated joint virtual scheduling scheme may schedule substantially the same set of data transmission of each sub-channel from each cell of the cluster 110a of cells for a user and/or coordinate a joint assignment of such sub-channels.

Figure 2:
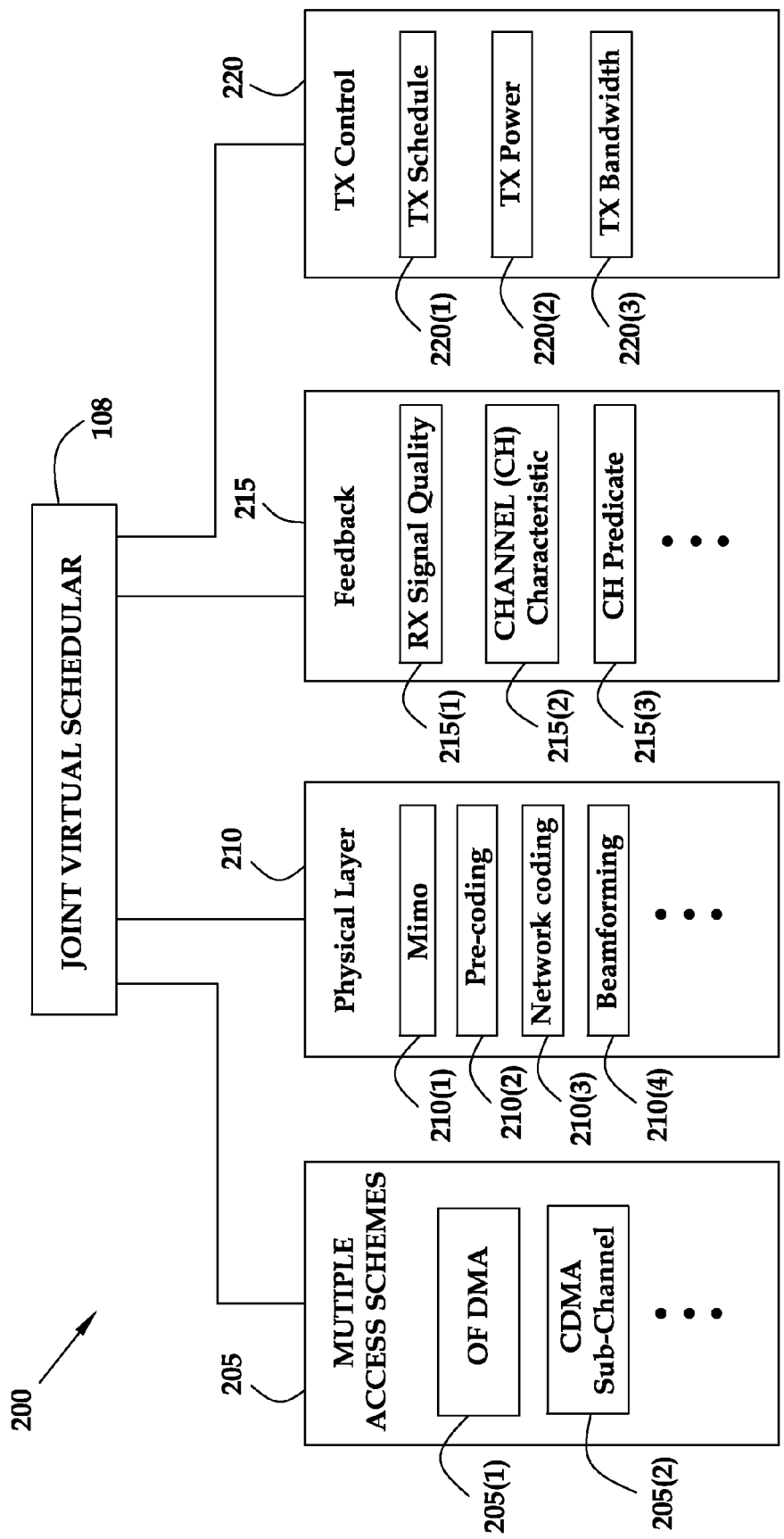
FIG. 2 schematically depicts an architecture of joint scheduling for the Long Term Evolution (LTE) UMTS system in which the joint virtual scheduler shown in FIG. 1 may find application in accordance with one illustrative embodiment of the present invention.

FIG. 2 schematically depicts an architecture 200 of joint scheduling for the UMTS Long Term Evolution system 100 in which the joint virtual scheduler 108 shown in FIG. 1 may find application in accordance with one illustrative embodiment of the present invention. By using the architecture 200 of joint scheduling, the UMTS Long Term Evolution system 100 may not only control the intra-cell transmissions 130(1, 2) and 135(1) based on radio channel feedback through an air interface but also coordinate the inter-cell transmission 135 (2) between the cluster 110a of cells for providing an interference management. The joint virtual scheduler 108 may manage a radio resource of all the base stations 115(1, 2) within the cluster 110a of cells in real time to jointly control the intra-cell and inter-cell interference for optimizing the overall system performance by such interference mitigation. This combined radio resource management and interference mitigation may maximize the signal-to-noise (SNR) ratio of a received signal, and thus, improve the system spectral efficiency.

The architecture 200 of joint scheduling may support a plurality of multiple-access schemes 205 to provide each user access to a common access medium without interference to other users. Examples of the plurality of multiple-access schemes 205 include as Orthogonal Frequency Division Multiple Access (OFDMA) 205(1), Code Division Multiple Access (CDMA) sub-channel 205(2), Time Division Multiple Access (TDMA), and Frequency Division Multiple Access (FDMA), and the like. Schemes for multiple-access are known in the art and in the interest of clarity only those aspects of multiple-access schemes 205 that are relevant to the present invention will be discussed further herein.

The architecture 200 of joint scheduling may support underlying a plurality of physical layer forms 210, such as Multiple-input Multi-output (MIMO) 210(1), pre-coding 210 (2), network coding 210(3), beam-forming 210(4), transmitted diversity, space-time coding, and the like. Techniques for physical layer forms are known in the art and in the interest of clarity only those aspects of physical layer forms 210 that are relevant to the present invention will be discussed further herein.

For different multiple access schemes of the plurality of multiple-access schemes 205 and the plurality of physical layer forms 210, an optimization of a system performance metric may be based on degree of information available for optimization such as knowledge or feedback of a radio channel condition. In particular, the joint virtual scheduler 108 may use feedback 215 including, but not limited to, a signal quality measure of a received (RX) signal 215(1), a channel (CH) characteristic 215(2) and a channel predicate 215(3) of a distributed joint virtual scheduling. To provide inter-cell and intra-cell transmission (TX) control 220, the architecture 200 of joint scheduling may support a TX schedule 220(1), a TX power 220(2), and a TX bandwidth 220(3).

In partitioning of the set of virtual channels 145 by time, frequency, space, antenna, and/or codes for the cluster 110*a* of cells, the combination of these variables for the virtual channel may be based on the use of the physical layer form 210 and the multiple-access scheme 205. The resource partition for the virtual channel should be dynamic in real time to adapt to the channel variation of each user and the user mobility.

According to one embodiment of the joint virtual scheduler 108, the joint virtual scheduler 108 may support soft-handover for a HSDPA system. In the HSDPA system, one of the primary interference sources is the inter-cell interference. For example, a significant inter-cell interference is observed at a region where the associated dedicated channels (DCHs) are in soft-handover. If soft-handover is supported for the HSDPA users, the sources of the inter-cell interference for each user result in the signal enhancement when the users are in a handover region. When the soft-handover is supported for the HSDPA users, the virtual channel comprises the HSDPA physical channels from all the cells 110 involved in the handover and has the macro diversity gain in the received signals. Since the inter-cell interference mitigates to, in turn, provide the signal enhancement, as the joint virtual scheduler 108 brings the interference under control, it may support the HSDPA soft handover for the HSDPA users.

Another embodiment of the joint virtual scheduler 108 may support macro-diversity coherent combining in the OFDMA air interface. In the OFDMA system, one of the primary interference sources is the co-channel interference from the neighboring cell 110(*m*), as shown in FIG. 1. For a universal reuse, in the OFDMA system, the mutual interferences are generated at an overlap region covered by multiple cells 110 when the contents in each sub-channel are different from different cells 110 and are scheduled for transmission independently. A macro-diversity scheme may schedule the same set of data transmission of the sub-channels from all cells in the overlap region for a specific user. Since the virtual channel of the OFDMA system with the macro-diversity scheme provides an orthogonal set at the overlap region, the interference may mitigate as the signal enhancement. For joint scheduling in the OFDMA system, the joint virtual scheduler 108 may coordinate the sub-channel joint assignments for all the cells in the cluster 110*a*.

Figure 3:
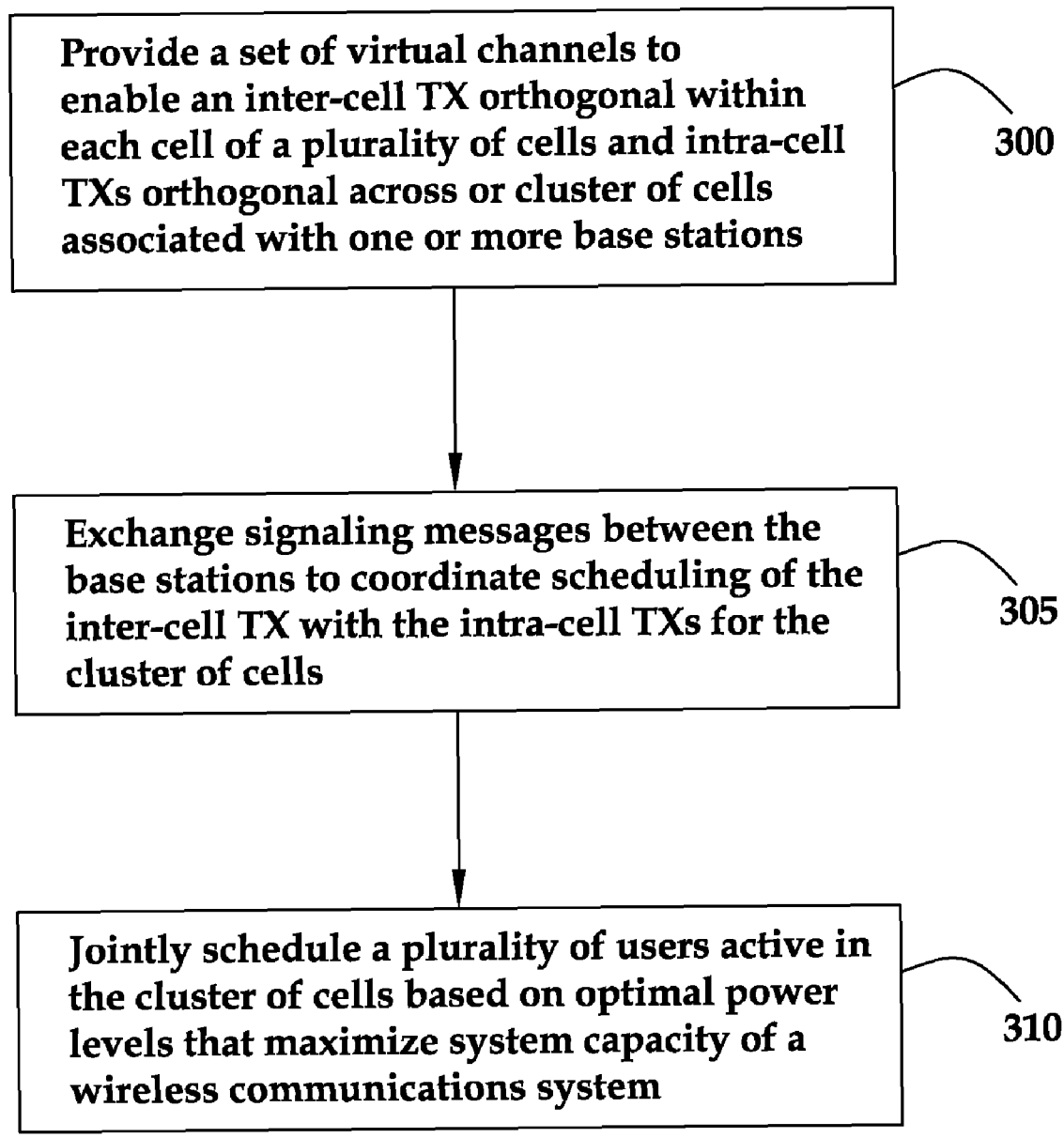
FIG. 3 depicts a stylized representation for implementing a method that may use a set of virtual channels for active users and signaling messages between the base stations to coordinate a joint scheduling of inter-cell transmission with intra-cell transmissions for a cluster of cells in the wireless communications system shown in FIG. 1 consistent with an exemplary embodiment of the present invention.

FIG. 3 depicts a stylized representation for implementing a method of coordinating a joint scheduling of the transmissions 130(1, 2), 135(1), and 135(2) based on power assignments in the UMTS Long Term Evolution system 100 shown in FIG. 1 consistent with an exemplary embodiment of the present invention. At block 300, the joint virtual scheduler 108 may use the set of virtual channels 145 for active users and the signaling messages (SIG_MSG) 150(1, 2) between the base stations 105(1, 2) for jointly scheduling the inter-cell transmission 135(2) with intra-cell transmissions 130(1, 2) and 135(1) for the cluster 110*a* of cells. To enable the intra-cell transmissions 130(1, 2) and 135(1) orthogonal within the cluster 110*a* of cells of the plurality of cells 110(1-*m*) and the inter-cell transmission 135(2) orthogonal across the cluster 110*a* of cells associated with the base stations 105(1, 2), the joint virtual scheduler 108 may provide the set of virtual channels 145 to assign a virtual channel to each user in the cluster 110*a* of cells.

By exchanging the signaling messages (SIG_MSG) 150(1, 2) between the base stations 105(1, 2), at block 305, the joint virtual scheduler 108 may coordinate scheduling of the inter-cell transmission 135(2) with intra-cell transmissions 130(1, 2) and 135(1) for the cluster 110*a* of cells. The joint virtual scheduler 108 may coordinate control and virtual channel assignment between the cluster 110*a* of cells to manage overall interference for the cluster 110*a* of cells. Using the parameter optimization algorithm 140, the joint virtual scheduler 108 may determine power assignments of optimal power levels for the active users and communicate to the first and second base stations 105(1, 2), respectively. Based on the optimal power levels, which maximizes the system throughput/capacity of the UMTS Long Term Evolution system 100, the joint virtual scheduler 108 may jointly schedule the Access Terminals 120(1, 2) and 125(1) of the active users within the cluster 110*a* of cells, as indicated in block 310.

Consistent with one embodiment of the present invention, the joint virtual scheduler 108 may be an aggressive interference management scheme that coordinates control and assignment between the cluster 110*a* of cells. The joint virtual scheduler 108 may rely on the high-speed data link 170(1) for optimal performance between processing nodes, i.e., the cells 110 or associated processors of the base stations 105 for providing relatively fast communications between the cells 110 to enable the UMTS Long Term Evolution system 100 to fetch the information of the radio channel characteristics for each user and the cross correlation between the cells 110 for interference management. For providing the interference management, the joint virtual scheduler 108 may deliver control information, such as a precise time stamp to each base station 105. This information exchange may occur over the high-speed data link 170(1) between processing nodes, which may include the base stations 105, the controllers, and/or the processors.

However, the conventional UMTS system Specifications specify a U-plane UMTS Terrestrial Radio Access Network (UTRAN) delay requirement of 5 ms in an unload condition. This U-plane delay is defined in terms of the one-way transit time between a packet being available at the Internet Protocol (IP) layer in either the User Equipment (UE), such as the AT 120/Radio Access Network (RAN) edge node and the availability of this packet at the IP layer in the RAN edge node/UE, i.e., the AT 120. This RAN edge node is a node that provides an RAN interface towards a core network (CN).

Specifications of the UMTS Long Term Evolution system 100 may enable an Evolved UTRAN (E-UTRAN) U-plane latency of less than 5 ms in the unload condition (i.e., a single user with a single data stream) for small a IP packet, e.g., a 0 byte payload+IP headers in a E-UTRAN bandwidth mode may impact an experienced latency. This U-Plane latency may indicate a desire for a high-speed inter-connection between the processing nodes, such as the base stations 105 within the UTRAN. In the conventional UMTS system, however, an IP transmission over T1/E1/J1 in the UTRAN may not meet a UTRAN latency threshold. To meet the delay thresholds, a 10 BaseT Ethernet, 100 BaseT Ethernet, gigabit Ethernet, 10 Giga Ethernet or 100 Giga Ethernet may provide inter-connection between the processing nodes including the base stations 105. For example, the gigabit Ethernet with high capacity to support such inter-connection uses gigabit Ethernet switches or hops, which may support a QoS feature to control the latency in the UMTS Long Term Evolution system 100. By using the gigabit Ethernet as the UTRAN transport, the UMTS Long Term Evolution system 100 may configure the gigabit Ethernet switch for exchanging the control information and interference management information between the processing nodes including the base stations 105 with a relatively high QoS priority to minimize their latency.

The desired U-Plane Delay latency also indicates use of a high-speed data processing capability for a data chain in the UTRAN. The high-speed data links 170(1) between the processing nodes including the base stations 105 may enable distributed processing capabilities for the joint virtual scheduler 108. For example, high-speed computational processors may be used in one embodiment for enabling the distributed processing capabilities. Such a distributed processing may not only be beneficial in collecting information and computation for the interference management in the joint virtual scheduler 108, but may reduce the overall costs.

In one illustrative embodiment, to coordinate the radio resource in the UMTS Long Term Evolution system 100 and manage the overall system interference for all the cells in the cluster 110a, the joint virtual scheduler 108 may use a common reference time among all cells in the cluster 110a. While this common reference time among all cells in the cluster 110a may provide a reference of all control information and interference management, the conventional UMTS system deploys a free running clock with a desired high accuracy in the base stations 105 without a synchronization therebetween. Although, a common network clock for a hierarchical network in the UTRAN and the core network is available, such a network clock may not meet a desired accuracy. Accordingly, in the UMTS Long Term Evolution system 100, may use system and frame counters, such as System Frame Number (SFN), Node B Frame Number (BFN), RNC common Frame Number (RFN), and Cell System Frame Number (CFN) to provide a data link and virtual synchronization between the base stations 105.

Alternatively, in the W-CDMA system, where interference is managed through non-coordinated power control, use of a free running clock along with inaccurate network synchronization may manipulate the cross-interference. Use of the reference time for other multiple access technologies, such as OFDMA and TDMA with stringent synchronization between the processing nodes including the base stations 105 enables the interference management, such as interference avoidance and coordination.

In another embodiment, the Global Positioning System (GPS) time may be used to provide a common reference time since each cell in the cluster 110a may independently measure with substantially the same accuracy. For example, the GPS time is used by the CDMA system to synchronize the base stations 105 and support the handover. Likewise, the GPS absolute time may provide a common reference time for the joint virtual scheduler 108 to control the system information, to manage the interference, and to schedule the virtual channel for each cell 110.

In one embodiment, the architecture 200 shown in FIG. 2 may be consistent with a base station router (BSR) while coupling the base stations 105 (1, 2) in the cluster 110a with the high-speed communication links 170 and using the joint virtual scheduler 108 to interconnect all the base stations 105 in a distributed manner. A distributed architecture with a virtual controller based on the BSR may comprise a virtual scheduler server that may be a distributed computational node that collects feedback information and user information from each base station 105 and assigns virtual channels to all users in the cluster 110a to maximize the system performance. The virtual scheduler server may be distributed at each base station 105 such that a base station provides a primary node for the information distribution, parallel computation, and information collection for final scheduling and virtual channel assignment. The distributed virtual scheduler server architecture may enhance some of the HSDPA/E-DCH features for the high-speed communication links 170 between the base stations 105 for coordination and management.

Another alternative of the distributed virtual scheduler server architecture is a dedicated scheduling server for enabling a joint scheduling control in which all base stations 105 operate as a client to the dedicated scheduling server. The dedicated scheduler server based client-server architecture may enable an efficient joint virtual channel assignment and overall resource management while effective in cost control.

The feedback and user information used by the joint virtual scheduler 108 may include the radio channel conditions of each user, buffer data and its time stamp for each user, user mobility, and user capability information. To minimize the interference while maximizing the system throughput/capacity, the joint virtual scheduler 108 may collect the feedback and user information from all cells 110 in the cluster 110a as an input and then perform a virtual channel assignment for each user in the cluster 110a based on the feedback and user information.

For optimizing a parameter associated with scheduling of a plurality of users from the cluster 110a of cells, in the UMTS Long Term Evolution system 100, the joint virtual scheduler 108 may search an optimal power level for the parameter of each user of the plurality of users. A search algorithm may maximize an indication of system capacity of the UMTS Long Term Evolution system 100 by jointly scheduling the plurality of users active in the cluster 110a of cells based on the optimal power levels. For example, the joint virtual scheduler 108 may use the parameter optimization algorithm 140 to search for a sub-optimal solution of a resource for each user in the cluster 110a of cells. In this way, the joint virtual scheduler 108 may schedule each user in the cluster 110a of cells based on an optimization of power level as an objective function being the sum of the Shannon capacity of the plurality of users in the cluster 110a of cells.

The joint virtual scheduler 108 may be based on a virtual channel structure model for N users in the UMTS Long Term Evolution system 100 (in whole clusters) in which a matrix A comprises matrices of the correlation between the base stations 105, the physical layer forms 210 shown in FIG. 2 for the N users in the cluster 110a. Each correlation matrix indicates a joint channel correlation in space, time, frequency, code, antenna technology, and coding technology. A vector x indicates the desired virtual channels for all N users in the joint virtual scheduler 108. The vector x may be a function of space, time, frequency, code, antenna technology, and coding technology in the following, $$\vec{x} = \begin{bmatrix} x_1 \\ x_2 \\ \vdots \\ x_N \end{bmatrix} \text{ and } x_i = g(s, f, t, a, c, sf)$$

$$i = 1, 2, \ldots, N$$

g: a general function
s: a set of space attenuation functions between the users and the base stations 105 (1, 2) in the cluster 110a. S is a multi-dimensional attenuation function relative to all the base stations 105 (1, 2) in the cluster 110a.
t: a set of transmit time slots for a transmission among base stations in the cluster 110a f: a set of frequency band or frequency sub-channels for a sub-carrier.

a: a set of antenna patterns and technologies, such as the MIMO 210(1), transmit diversity, beam-forming 210(4), c: a set of coding and pre-coding schemes sf: a set of the time domain spreading codes for a spread spectrum communication.

According to one solution of the virtual channel assignment, the vector x is the Eign vector of the correlation matrix A. In this solution, the Eign value of the matrix A indicates the energy distribution on each Eign vector. However, the matrix A is a function of multiple variables, such as the attenuation relative to each base station, channel correlation between antenna in each base station, the frequency selectivity effect of sub-channel, the spreading sequence and the channel correlation between the time slots. Each variable increases the dimension of the matrix A multiple times depending upon the basis of that variable. Multiple variables cause a multiplicity of effects on a single variable. The complexity and the dimensions of the matrix A increase multi-fold when all the supported physical layer forms 210 and the multiple-access schemes 205 are considered for all base stations 105 in the clusters 110a.

Accordingly, to obtain a desired solution, the complicity of the matrix A may be reduced by simplifying the generic correlation matrix A as the physical layer forms 210 or defining a specific multiple-access scheme 205. For example, in a generic R-99 single antenna W-CDMA DL system, as the time, frequency, code, and antenna are constants, the spreading codes are an orthogonal set within same scrambling code. Moreover, the matrix A is a function of space and the cross correlation between the scrambling code between the base stations 105. Thus, the joint virtual scheduler 108 provides a scrambling set for all the base stations 105 to minimize the cross interference for all users in the clusters 110a.

However, if a single antenna HSDPA system is indicated for the matrix A, the joint virtual scheduler 108 includes the time variable to provide a scrambling code set that minimizes the cross-interference for the user scheduled at that time. Since the HSDPA system supports multi-user scheduling in a TTI, instead of using a new scrambling code set to minimize the cross-interference for obtaining a sub-optimal solution, alternatively the joint virtual scheduler 108 may manage the interference with the current scramble code set. This solution of the interference management in the HSDPA system may support the soft-handover for all users in a handover region. When users are in the handover region, the joint virtual scheduler 108 may coordinate the transmission time with the same set of HS-PDSCH codes among all base stations 105 participating in the soft handover. The joint virtual scheduler 108 may minimize the cross or inter-cell interference since the interference source has been mitigated into a signal enhancement. As a result, the HSDPA users may receive a macro-diversity gain through this soft handover support.

Likewise, for a OFDMA system since the variables of the matrix A consist of frequency, time, and space, the joint virtual scheduler 108 may incorporate the overall sub-channel assignments jointly to the users of all base stations 105 in the cluster 110a in a given time slots to minimize the overall interference. In the OFDMA system, the interference management mitigates the co-channel interference into the signal enhancement. Moreover, the joint virtual scheduler 108 may achieve a target of the universal reuse by tightly coordinating the transmission and sub-channel assignments for the cell 110(2) and its neighboring cells, such as the cell 110(m).

To provide joint sub-channel assignments with a given maximum gain, the joint virtual scheduler 108 may assign the channel to the users of the maximum combining gain and minimum co-channel interference. While, such a simplified matrix A indicates the correlation of sub-channel sets for each base station 105 relative to each user, the sub-channel assignment and co-channel interference may be characterized by the spatial attenuation from each base station to all users. The joint virtual scheduler 108 may partition all sub-channels for all cells 110 in the cluster 110a and indicate a scheduling strategy for the sub-channel assignment to each user. In this way, the joint virtual scheduler 108 may coordinate transmission scheduling in the OFDMA system with maximum system performance.

To provide a scheduling strategy for a coordinated joint scheduling in an OFDMA system, the joint virtual scheduler 108 may schedule power, e.g., in time and frequency domains, for the transmissions from all base stations 105 in a cluster 110a to all UEs, i.e., the ATs 120, 125 in this cluster. The power is assigned in such a way that it maximizes the total throughput subject to a power constraint for each base station 105. The joint virtual scheduler 108 may use Shannon capacity to represent throughput, which implicitly implies that the data rates for the ATs 120, 125 may be selected accordingly.

In a frequency domain scheduling at any given time, the joint virtual scheduler 108 may maximize the total throughput/capacity. By adding scheduling in time domain, the joint virtual scheduler 108 may solve a functional optimization problem. By focusing on a given time first, i.e., frequency domain scheduling, the joint virtual scheduler 108 may provide a parametric optimization, as defined below:

$g_{i,j,k}$=link gain (in power) from a base station (BS) i to User Equipment (UE) or AT k on a channel j. The link gain indicates the correlation function for each user relative to each channel of every base station in the matrix A.

$p_{i,j,k}$=transmit power from BS i to UE k on a channel j where, $i \in \{1, \ldots, I\}$, I is the total number of base stations 105 in the cluster 110a

$j \in \{1, \ldots, J\}$, J is the number of sub-channels in each base station 105 that may be assigned to the UEs $k \in \{1, \ldots, K\}$, K is the total number of UEs in the cluster 110a

Following shows a problem formulation:

$$\max_{\substack{P=\{p_{i,j,k}\}, \\ \forall i \in \{1, \ldots, I\}, \\ j \in \{1, \ldots, J\} \\ k \in \{1, \ldots, K\}}} C_{total} = \sum_{k=1}^{K} C_k \qquad (1)$$

subject to the maximum power constraint of each base station 105 in the following $$\sum_{j=1}^{J} \sum_{k=1}^{K} p_{i,j,k} \leq p_0, \forall i \in \{1, \ldots, I\} \qquad (2)$$

where $$C_k = \sum_{j=1}^{J} C_{j,k} = \sum_{j=1}^{J} W \log_2 \left(1 + \frac{S_{j,k}}{I_{j,k}^C + I_{j,k}^I + \sigma^2}\right) \qquad (3)$$

is the per UE capacity.

$$S_{j,k} = \sum_{i=1}^{I} g_{i,j,k} p_{i,j,k} \qquad (4)$$

is the signal power for UE k on channel j.

$$I_{j,k}^C = \sum_{i=1}^{I} \sum_{\substack{k'=1, \\ k' \neq k}}^{K} g_{i,j,k'} p_{i,j,k'} \qquad (5)$$

is the co-channel interference caused by UE k on channel j to all other users on that channel j $$I_{j,k}^I = \sum_{i=1}^{I} \sum_{\substack{j'=1 \\ j' \neq j}}^{J} \sum_{\substack{k'=1 \\ k' \neq k}}^{K} \frac{g_{i,j',k'} p_{i,j',k'}}{F_{j,j'}} \qquad (6)$$

is the Inter-channel interference caused by UE k on channel j to all other users that are channels other than j $C_{total}$ is the total capacity of the cluster 110a where $C_k$ is the capacity for the kth UE.

W is the bandwidth, assumed to be known.

$p_0$ is the maximum transmit power from a base station 105, which is assumed to be the same for all base stations and assumed to be known.

$F_{i,j'}$ is the inter-channel attenuation between channel j and channel j'. It is used to model inter-channel interference and is assumed to be known. If a given base transceiver station (BTS) only transmits to one UE on a given channel, i.e., in the set of $\{P_{i,j,k}\}$, k=1, . . . , K, there is at most one non-zero element for any given pair of $\{i,j\}$.

The above formulated parametric optimization problem may be solved by classical methods such as Largrange multiplier method. However, being a large scale system in that the dimension is large, a central controller may optimize the total throughput by choosing I×J×K variables. Furthermore, in this case, the transmit power in each base station 105 may depend upon many local constraints. To address the central optimization vs. local constraints issue, the joint virtual scheduler 108 may use hierarchical control and to handle the large dimension by the central controller it may use an iteration method.

According to one embodiment of the present invention, FIG. 4 illustrates a stylized representation for implementing a method of scheduling power in frequency domain for the transmissions 130(1, 2), 135(1), and 135(2) from the base stations 105(1, 2) to the active Access Terminals 120(1, 2) and 125(1) in the cluster 110a of cells to maximize the total throughput or capacity for each base station 105 shown in FIG. 1. To this end, the parameter optimization algorithm 140 may comprise a High layer (HL) algorithm portion and a Lower layer (LL) algorithm portion, as shown in FIG. 4. As can be seen, the HL algorithm portion receives $\lambda_i$, i=1, . . . , N, the power penalty from the LL algorithm portion. The HL algorithm portion allocates power in a small amount $\Delta p$ by $\Delta p$. For each $\{i,j,k\}$, there are three associated quantities:

1. Throughput gain $A_{i,j,k}$(P)—gain in throughput for self if $\Delta p$ is allocated to $\{i,j,k\}$, given the current power allocation P 2. Co-channel and inter-channel interference penalty $B_{i,j,k}$(P)—penalty (loss in other user's throughput) if $\Delta p$ is allocated to $\{i,j,k\}$, given the current power allocation P 3. Base station power penalty $\lambda_i$, the power penalty from the LL algorithm portion.

In the HL algorithm portion, the power calculation is set forth in the following where the values of $A_{i,j,k}$, $B_{i,j,k}$ may be calculated using partial directives evaluated for a given power allocation. For example, as shown in the HL algorithm portion below:

Begin HL_algorithm

Step 1: use known link gains $\{g_{i,j,k}\}$ and previous power allocation at iteration n: $\{p_{i,j,k}\}$;

Step 2: Calculate $S_{j,k}$, $I_{j,k}^C$ and $I_{j,k}^I$, for all j, k, using equation (4), (5) and (6)

Step 3: Calculate $A_{i,j,k}$ and $B_{i,j,k}$ for all i, j, k. Here, $$A_{i,j,k} = \frac{\partial C_{j,k}}{\partial p_{i,j,k}} = \frac{W}{1 + \frac{S_{j,k}}{I_{j,k}^C + I_{j,k}^I + \sigma^2}} \cdot g_{i,j,k} \qquad (6)$$

Similarly, the HL_algorithm determines $B_{i,j,k}$ as well for all possible $\{i,j,k\}$.

Step 4: calculate the TX credit for all i,j,k:

$$L_{i,j,k} = A_{i,j,k} - B_{i,j,k} - \lambda_i \qquad (8)$$

Step 5: ordering $L_{i,j,k}$ and if $L_{i,j,k} > 0$, $p_{i,j,k} = p_{i,j,k} + \Delta$ Step 6: repeat until max $L_{i,j,k} < 0$ End of HL_algorithm.

In Step 7, for each base station 105, the LL algorithm portion updates and provides $\lambda_i$, i=1, . . . , N, the power penalty to the HL algorithm portion. Finally, at step 8, the LL algorithm portion determines the power assignments for each base station $\{P i,j,k\}$. However, to schedule power in time domain, the parameter optimization algorithm 140 may perform additional steps, as described below.

Figure 5:
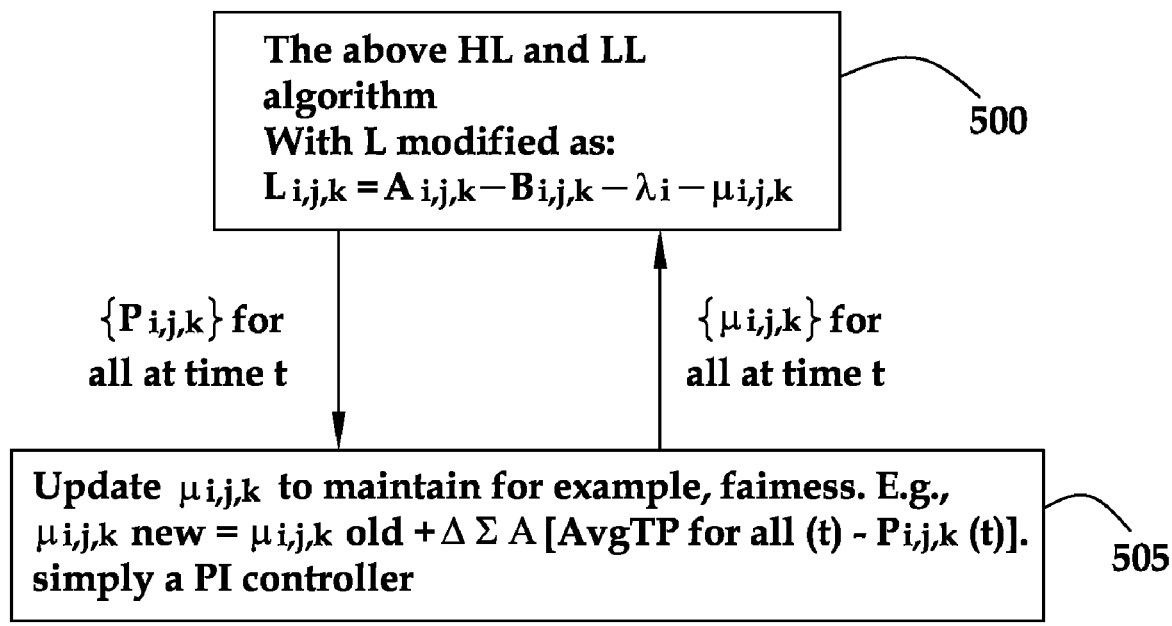
FIG. 5 illustrates a stylized representation for implementing a method of scheduling power in time domain for the transmissions from the base stations to the active Access Terminals in the cluster of cells to maximize the total throughput or capacity for each base station shown in FIG. 1, according to one illustrative embodiment of the present invention.

In accordance with one illustrative embodiment of the present invention, FIG. 5 illustrates a stylized representation for implementing a method of scheduling power in time domain for the transmissions 130(1, 2), 135(1), and 135(2) from the base stations 105(1, 2) to the active Access Terminals 120(1, 2) and 125(1) in the cluster 110a of cells to maximize the total throughput or capacity for each base station shown in FIG. 1. While in block 500, the maximization problem indicated above in FIG. 4 may be modified by adding a credit/penalty for "fairness." At block 505, the fairness may be maintained.

Table 1 below compares some metrics including priority ordering, credit and penalty of a conventional scheduling algorithm, such as a Proportional Fair (PF) scheduler, with the joint virtual scheduler 108.

|  | Current scheduler | Joint Scheduler |
| --- | --- | --- |
| Priority ordering | ordering within each BTS | ordering for a pool of BTSs and sub-channels |
| Credit | Self-throughput (C/I) | Self-throughput |
| Penalty | Fairness penalty (in time) | Fairness penalty (in time) Co-channel and inter-channel interference to others TX power impact on specific BTS total power |

In one embodiment, the high-speed wireless access network 115 may wirelessly communicate mobile data at a speed and coverage desired by individual users or enterprises. According to one embodiment, the high-speed wireless data network 120 may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS adapts the Wideband Code Division Multiple Access (WCDMA) technology and includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), 802.16, Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for scheduling transmissions by a plurality of base stations that serves a plurality of users in a wireless communication system, the method comprising:
   calculating, in a scheduling device, throughput gains for a plurality of subchannels between each user and each base station that result from incrementing power allocated to each sub channel by a selected amount;

calculating, in the scheduling, device, interference penalties for the plurality of subchannels between each user and each base station that result from incrementing the power allocated to each sub channel by the selected amount;

calculating, in the scheduling device, a transmission credit for each sub channel by setting each transmission credit equal to a measure of a difference between a throughput gain for each sub channel and an interference penalty for each sub channel and a power penalty for each base station; and allocating, in the scheduling device, an incremented power to each sub channel based on the transmission credit for each sub channel.

2. The method of claim 1, wherein calculating the throughput gains comprises calculating the throughput gains based on link gains for each of the plurality of subchannels and powers allocated to each of the plurality of subchannels prior to incrementing the power allocated to each sub channel by the selected amount.

3. The method of claim 1, wherein calculating the interference penalties comprises calculating at least one of a co-channel interference penalty or an inter-channel interference penalty.

4. The method of claim 3, wherein calculating the interference penalties comprises calculating the interference penalties based on link gains for each of the plurality of subchannels and powers allocated to each of the plurality of subchannels prior to incrementing the power allocated to each sub channel by the selected amount.

5. The method of claim 1, wherein allocating the incremented power comprises:

incrementing the power allocated to the subchannels when a maximum value of the transmission credits of the subchannels exceeds a threshold;

recalculating the throughput gains, the interference penalties, and the transmission credits using a further incremented value of the power allocated to the subchannels; and iteratively repeating the incrementing and recalculating steps until the maximum values of the transmission credits for all the subchannels is below the threshold, thereby determining a final incremented value of the allocated power.

6. The method of claim 5, wherein allocating the incremented power comprises recalculating the power penalty for each of the base stations based on the final incremented value of the allocated power.

7. The method of claim 6, comprising:

determining whether the recalculated value of the power penalty for each of the base stations differs from the previous value of the power penalty for each of the base stations by less than a threshold value; and iteratively repeating calculation of the throughput gains, interference penalties, and transmission credits using the recalculated value of the power penalty for each of the base stations until the difference is less than the threshold value.

* * * * *